United States Patent [19]

Mack

[11] Patent Number: 5,747,168

[45] Date of Patent: May 5, 1998

[54] PROCESS AND MIXTURE FOR APPLYING A COATING MADE OF THE PRECIOUS STONE LAPIS LAZULI ON A SUBSTRATE AND SUBSTRATE THUS PRODUCED

[76] Inventor: Peter Mack, Kriegsmühle 11, Neckargemünd, Germany

[21] Appl. No.: 407,006

[22] PCT Filed: Sep. 29, 1993

[86] PCT No.: PCT/DE93/00922

§ 371 Date: May 9, 1995

§ 102(e) Date: May 9, 1995

[87] PCT Pub. No.: WO94/07963

PCT Pub. Date: Apr. 14, 1994

[30] Foreign Application Priority Data

Sep. 29, 1992 [DE] Germany ............... 42 32 583.8
Oct. 9, 1992 [DE] Germany ............... 42 34 020.9

[51] Int. Cl.⁶ ............................ C09D 17/00; B05D 7/24
[52] U.S. Cl. ................. 428/425.8; 428/15; 428/461; 428/480; 427/385.5; 427/407.1; 427/419.1; 524/443; 524/450; 524/456; 524/791
[58] Field of Search .................... 428/425.8, 15, 428/461, 480; 524/450, 456, 443, 791; 427/385.5, 407.1, 419.1

[56] References Cited

U.S. PATENT DOCUMENTS

| 3,251,704 | 5/1966 | Nellessen | 106/171.1 |
| 3,642,346 | 2/1972 | Dittmar | 156/332 |
| 3,861,990 | 1/1975 | Kasai et al. | 161/7 |
| 4,312,855 | 1/1982 | Grand | 514/595 |
| 4,809,417 | 3/1989 | Normann, Jr. | 228/124 |

FOREIGN PATENT DOCUMENTS 1539718  8/1968  France.

*Primary Examiner*—Andrew E. C. Merriam
*Attorney, Agent, or Firm*—Collard & Roe, P.C.

[57] ABSTRACT

The presently claimed process for applying a coating to a substrate and coating composition comprises coating on the substrate the composition comprising a mixture of the precious stone pigment lapis lazuli having a grain size of from 5 to 90 microns with a colorless vehicle comprising a lacquer system in an amount effective to encapsulate the stone pigment, the mixture also comprising a pyrite or pulverised material.

12 Claims, 1 Drawing Sheet

PROCESS AND MIXTURE FOR APPLYING A COATING MADE OF THE PRECIOUS STONE LAPIS LAZULI ON A SUBSTRATE AND SUBSTRATE THUS PRODUCED

TECHNICAL FIELD

The invention relates to a process for producing a coating made of the precious stone lapis lazuli and for applying such a coating to a substrate, as well as to such a coating and to a substrate so produced.

STATE OF THE ART

It was practically not possible heretofore to carry out work such as lacquering or inlaying work with lapis lazuli. The thin cuts of lapis lazuli stone required for inlaying work are too fragile for permitting the cutting and processing of configurations.

Lapis lazuli is an aluminum silicate, the atomic lattice of which contains sulfur atoms that provide the precious stone with its characteristic blue coloration. Lapis lazuli consists of about 6 different minerals such as pyrite, among others, which, following grinding, have to be separated in order to extract the blue pigment. Extracting the pigment from the ground, crystalline precious stone is accomplished with a modern treatment process that supplies yields of the various color shades of between 3 to 10% pigment of different blue tints from the precious stone, so that after the separation process, lapis lazuli precious stone pigments are separately available in the crystalline form in different blue shades ranging from light to dark blue.

The use of larger quantities of lapis lazuli precious stone pigment was not possible until now because the old techniques supplied only an extremely low yield. However, the lapis lazuli precious stone pigment is practically irreplaceable for restorations, particularly of works from the Orient, for book illustrations, or particularly valuable refinements or artistic decorations of objects such as inlay work.

A process for producing a pasty, shapable coating for buildings, or for producing architectural motifs or tiles on the basis of liquid, transparent resins with mineral substances has become known from FR-A-1 539 718, with about up to 70% of such substances being admixed to the resin. The mineral substances specifically consist of pulverized lava, silicon, cement, carbon, mica, as well as of mother-of-pearl powder and phosphorescent and fluorescent substances, to which mineral color pigment may be admixed as well. The use of such pasty compounds serves for imitating marble or other grains or textures.

The manufacture of a compound of a color-like, reflecting coating has become known from U.S. Pat. No. 3,251,704, which coating, following drying, is present as a reflecting surface layer consisting of a mixture of transparent lacquer-containing non-volatile, film-forming vehicle materials, semispherical, reflecting microspheres of transparent glass, and nonmetallic, chemically inert, colored pigment particles in the form of organic molecule complexes (clusters) of pigment powder with a size distribution between 2 and 70 microns. Said coating compound serves for coating spherical lenses or glasses in order to produce color effects, particularly reflecting effects of the lenses or glasses.

TECHNICAL PROBLEM

The invention is based on the problem of using the precious stone lapis lazuli in the crystalline form as a ground stone in many different ways on practically any desired substrates for refining the surface of the latter.

Disclosure of the invention and its advantages

The solution to the problem lies in that crystalline lapis lazuli precious stone pigment with a grain size of between 5 and 90 microns is used and mixed with a colorless vehicle, namely self-curing or reaction-curing lacquer systems, particularly polyester, polyurethane or acrylic lacquer, or automotive lacquer in a one- or two-layer lacquering, and mixed with additional colorless lacquers, if need be-, and this mixture is applied to the substrate preferably by spraying or lacquering, and ground or polished following drying or curing on the substrate, if necessary. Subsequently, the coating can be coated with a colorless covering lacquer. Before the mixture is applied, the substrate is preferably roughed or slightly ground, and the mixture is then applied by spraying or lacquering. Preferably, the substrate is first coated with a baking lacquer and the latter is permanently applied, preferably by baking, and the mixture is applied to the substrate only thereafter.

According to a particularly advantageous implementation of the invention, crystalline lapis lazuli pigment with a grain size of 20 to 60 microns, preferably 20 to 40 microns, is mixed with 1 to 6% by weight crystalline pyrite with a grain size of 30 to 150 microns, preferably 60 to 90 microns. This means that the pyrite, which had been previously withdrawn in the preparation of the pure lapis lazuli precious stone pigment, is subsequently added again in order to more or less intensify the intensive blue coloration and sparkling of the blue coloration. Said mixture consisting of lapis lazuli pigment and pyrite is then mixed with a colorless vehicle. Instead of pyrite it is possible to use a pulverized material suitable for replacing pyrite, for example such as gold spangles, gold powder, brass or bronze powder, or aluminum dioxide powder, whereby such material has a grain size of 10 to 100 microns, preferably 60 to 90 microns. For this purpose, each 100 grams of a colorless vehicle is mixed with 25 to 80 grams, preferably 55 grams crystalline lapis lazuli precious stone pigment, and 1 to 6 grams pyrite, preferably 1 to 3 grams.

The colorless vehicle for producing the mixture is preferably a self-curing or reaction-curing lacquer system, in particular polyester, polyurethane or acrylic lacquer, or automotive lacquer in a one- or two-layer lacquer coating, which is mixed with additional colorless lacquers, if need be.

In a ready-for-use mixture according to the invention for lacquering or spraying a substrate, each 100 grams of a colorless vehicle is comprised of 25 to 80 grams, preferably 55 grams crystalline lapis lazuli precious stone pigment with a grain size of 20 to 60 microns, preferably 20 to 40 microns, and 1 to 6% by weight crystalline pyrite, preferably 1 to 3% by weight, particularly 2 to 3% by weight, with a grain size of 30 to 150 microns, preferably 60 to 90 microns.

The advantage of the invention consists in that lapis lazuli precious stone pigments in the crystalline form, with different blue shades consisting of crystalline lapis lazuli precious stone pigments of varying blue tints, preferably with pyrite and a colorless vehicle, can be applied to a great variety of substrates as a thin coating, preferably by spraying or lacquering. Following the application to the substrate and drying or curing, the mixture can be ground and/or polished, if necessary, so that the characteristic deep blue coloration is produced. Said surface of the mixture, which is ground and polished, if necessary, can be subsequently painted with a cleat top lacquer and thus protected, and particularly the surface can be hardened in this way, whereby the covering lacquer may consist of a clear polyester or polyurethane or acrylic lacquer in the way known per se.

The visual appearance in the form of an intensive, deep blue coloration is produced in that the natural lapis lazuli has large, smooth crystal surfaces reflecting the light more intensively than small and uneven surfaces, and that the crystals are transparent, thereby reflecting the penetrating portion of the light on the crystals disposed underneath, whereby said effect is intensified to a glittering effect by the admixed pyrite.

For producing the coating, the lapis lazuli precious stone pigment is mixed with a colorless vehicle, which preferably is a polyester or polyurethane or acrylic lacquer, which can be mixed with additional colorless lacquers, if need be. In this way, a mixture is obtained which, with suitable dilution, can be applied to practically any desired substrates or undergrounds, preferably by spraying, so that said mixture can be processed further, for example ground and lacquered following drying or curing in the manner described. A substrate coated with lapis lazuli precious stone pigment in such a way can be combined with additional noble materials such as, for example marble, tiles or fine woods, to which a desired pattern of the substrate is glued or applied. For increasing the intensive optical effect, the substrate can be predyed in blue within itself.

Of advantage is the fact that the mixture can be supplied, particularly sprayed onto foils, for example a thin polyester foil, which can be first slightly ground or roughed. Following drying of the applied mixture, the desired shape can be cut or punched from the foil, whereupon the foil can be glued to an additional underground. The coating on the foil is then ground or polished and painted over with a colorless lacquer.

A further advantage of the mixture is that the lapis lazuli precious stone pigment and also the pyrite can be recovered at any time from the composite in the mixture or also on a substrate or underground without destroying the precious stone pigment or causing the latter to change its color. Within the mixture, the lapis lazuli precious stone pigment is contained in the form of crystals with a small or extremely small grain size of between 5 and 90 microns, preferably 20 to 40 microns. For such recovery, the lapis lazuli precious stone pigment is recovered from the coating or mixture in a way such that the substrate or the underground is dissolved by melting, burning or chemically dissolving the vehicle of the mixture, or by dissolving the vehicle in some other way, so that the lapis lazuli precious stone pigment and the pyrite are completely recovered from the vehicle.

Short description of the drawing, in which

PREFERRED EMBODIMENT OF THE INVENTION

A foil 1 is coated by means of a coating consisting of a mixture comprised of lapis lazuli precious stone pigment and a colorless vehicle, whereby the foil 1 is slightly roughed or ground prior to the application. Following drying or curing of the coating, a pattern 3 can be punched or cut from the foil 1, which can be accomplished by means of a programmable plotter-cutter. Following the removal of the pattern 3, the latter is glued , for example to another underground 4, which can be a table, by means of a suitable adhesive. Thereafter, the coating of the foil pattern 3 on the underground 4 is ground and polished, if need be, so that the blue coloration of the lapis lazuli precious stone pigment is brought out fully. Subsequently, the surface of the foil pattern 3 or coating on the underground 4 is covered with a colorless top lacquer, which, for example, is a polyester, polyurethane or acrylic lacquer, and which particularly has a high surface hardness and resistance to abrasion in order to protect the coating. Or the coated foil 1 is ground and polished and subsequently painted with a clear lacquer. Following drying or curing of the clear lacquer, a pattern 3 is cut from the foil 1 or punched from the latter and glued to the underground or into a matching recess. In this way, it is possible to produce practically any desired foil patterns and use the latter for special decorations or refinements on a great number of undergrounds.

Figure 1:
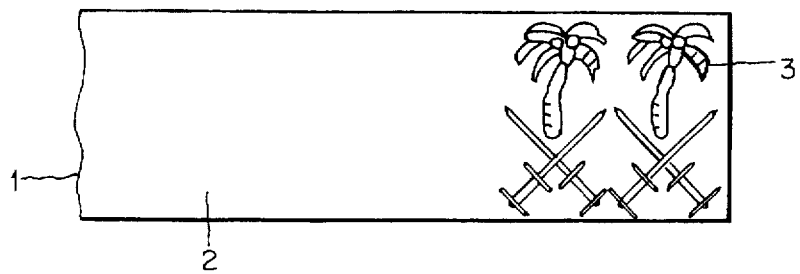
FIG. 1 shows a foil, which is coated with a mixture of lapis lazuli precious stone pigment and vehicle, from which a pattern is cut by a programmable plotter-cutter.
Figure 2:
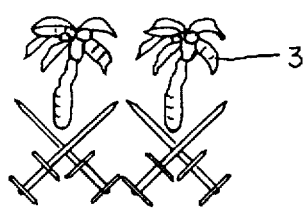
FIG. 2 shows the foil pattern removed from the foil.
Figure 3:
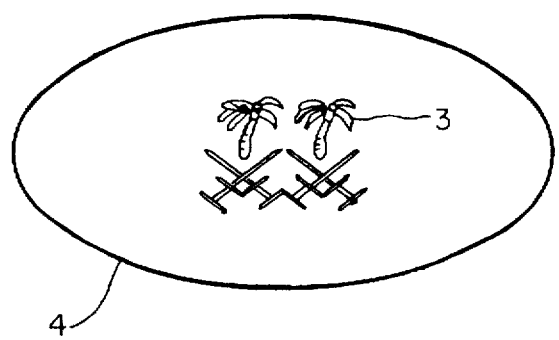
FIG. 3 shows the foil pattern applied to a table surface as an underground.
Figure 4:
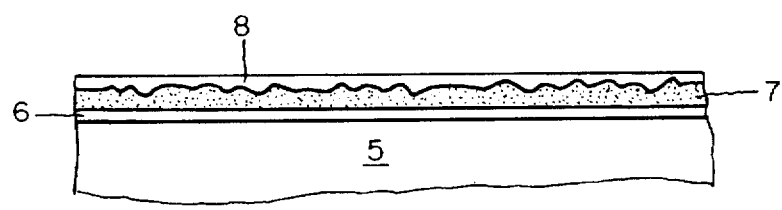
FIG. 4 shows an enlarged, schematic cross section through a substrate coated with the mixture.

FIG. 4 shows in general application an enlarged cross section through a substrate 5. The latter has been coated first with a lacquer 6, which is permanently arranged on the substrate 5; preferably, the lacquer is a transparent baking lacquer 6 baked on the substrate 5. The finished baking lacquer 6 prevents demixing from occurring during the subsequent application of the mixture 7, and particularly prevents lacquer particles of the baking lacquer 6 or of the surface of the substrate 5 or color of the latter from diffusing into the freshly applied mixture 7. A mixture 7 comprised of crystalline lapis lazuli pigment 11 and pyrite 10 in a vehicle 12 is applied to said lacquer layer 6. The lapis lazuli pigment 11 has a grain size of 20 to 60 microns, preferably 20 to 40 microns, and the pyrite 10 has a grain size of 30 to 150 microns, preferably 60 to 90 microns, which means the grain of the pyrite is normally larger.

After said mixture 7 has dried or cured, it can be slightly ground or polished. Subsequently, a covering lacquer 8 is applied, which is capable of compensating the minor unevenness in the graining of the lapis lazuli pigments and the one of the pyrite, and which in turn can be ground or polished following drying or curing.

An example of the mixture is prepared as follows: To a unit of lapis lazuli pigment 11 with a grain size of 20 to 60 microns, preferably 20 to 40 microns, there is added 1 to 6% by weight, preferably 1 to 3% by weight, particularly 2 to 3% by weight pyrite with a grain size of 30 to 150 microns, preferably 60 to 90 microns, or a material replacing pyrite, such as gold spangle, gold powder, brass or bronze powder, aluminum dioxide powder, whereby such material has a grain size of 10 to 100 microns, preferably 60 to 90 microns, resulting in a mixture of lapis lazuli pigment and pyrite, or a material replacing pyrite. Then, between 25 to 80 grams, preferably 55 grams of the mixture is added per each 100 grams of a liquid vehicle, for example a self-curing or reaction-curing lacquer system, particularly polyester, polyurethane or acrylic lacquer, or an automotive lacquer in a one- or two-layer lacquering, so that approximately 0.5 to 3% by weight, preferably 2 to 3% by weight pyrite or of a material replacing pyrite is contained in the finished mixture, the latter being ready for use.

Figure 5:
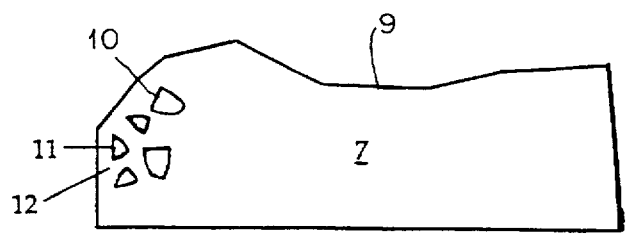
FIG. 5 shows an enlarged, schematic cross section through the mixture.

FIG. 5 shows in an enlarged representation a schematic section through a mixture 7 for illustrating that the individual lapis lazuli precious stone pigments 11 are smaller than the pyrite particles 10, which are embedded in the mass of the vehicle 12. FIG. 5 shows, furthermore, that the surface 9 of the mixture is irregular due to the graining of the pigments; such irregularities are smoothened and hardened with a covering lacquer 8.

Commercial applicability

The process is excellently suitable for producing a mixture with crystalline lapis lazuli precious stone pigment, with which a great number of materials can be coated such as, for example, fountain pens, decorative objects, glasses and many others, whose surfaces are to be provided with an intensive, shining blue coloration with a more or less pronounced sparkling effect, for example of pyrite, gold, brass or bronze, or Eloxal (aluminum dioxide).

We claim:

1. Process for producing a coating containing a mixture made of the precious stone lapis lazuli on a substrate comprising the steps of:

mixing crystalline lapis lazuli precious stone pigment with a grain size of between 5 and 90 microns with a colorless vehicle in an amount effective to encapsulate the lapis lazuli, the vehicle comprising a self-curing or reaction-curing lacquer system selected from the group consisting of polyester lacquer, polyurethane lacquer, acrylic lacquer, and automotive lacquer in a one-layer lacquer or a two-layer lacquer, mixed with additional colorless lacquers;

mixing each 100 grams of said colorless vehicle with 25 to 80 grams of crystalline lapis lazuli precious stone pigment, and 1 to 6 grams of pyrite;

applying said mixture to the substrate;

drying or curing said mixture on the substrate; and grinding or polishing the mixture on the substrate.

2. Process according to claim 1, comprising applying the mixture to the substrate; and after drying or curing the mixture and grinding or polishing the mixture, coating with a colorless covering lacquer.

3. Process according to claim 1, comprising prior to the applying of the mixture, roughening or slightly grinding the substrate; and applying the mixture to the substrate by spraying or lacquering.

4. Process according to claim 1, comprising coating the substrate with a baking lacquer which is permanently applied by baking;

applying the mixture to the substrate thereafter by spraying or lacquering.

5. Process according to claim 1, comprising mixing crystalline lapis lazuli pigment having a grain size of 20 to 60 microns, with crystalline pyrite or a pulverized material having a grain size of 30 to 150 microns.

6. Process according to claim 5, comprising producing a mixture of crystalline lapis lazuli pigment having a grain size of 20 to 40 microns, with crystalline pyrite of grain size of 60 to 90 microns.

7. Process according to claim 5, comprising using a pulverized material instead of pyrite to replace pyrite; and said pulverized material selected from the group consisting of gold spangles, gold powder, brass powder, bronze powder and aluminum dioxide powder, whereby the material has a grain size of 10 to 100 microns.

8. Process according to claim 6, comprising mixing each 100 grams of a colorless vehicle with 25 to 80 grams of crystalline lapis lazuli precious stone pigment, and 1 to 6 grams of a pulverized material capable of replacing pyrite selected from the group consisting of gold spangle, gold powder, brass powder, bronze powder, and aluminum dioxide powder.

9. A substrate coated with a mixture of precious stone lapis lazuli, comprising a substrate having applied thereto;

a colorless vehicle comprising a self-curing or reaction-curing lacquer system selected from the group consisting of polyester lacquer, polyurethane lacquer, acrylic lacquer, and automotive lacquer in a one-layer lacquering or a two-layer lacquering, mixed with additional colorless lacquers;

wherein each 100 grams of said colorless vehicle which is effective to encapsulate the lapis lazuli additionally contains from 25 to 80 grams of crystalline lapis lazuli precious stone pigment with a grain size of 5 to 90 microns; and additionally contains from 1 to 6 grams of crystalline pyrite or pulverized material, and having a grain size of 30 to 150 microns.

10. A substrate according to claim 9, wherein each 100 grams of said colorless vehicle comprises said crystalline lapis lazuli precious stone pigment with a grain size of 20 to 60 microns, and 1 to 6 grams of the pulverized material; and said pulverized material being capable of replacing pyrite and being selected from the group consisting of gold spangle, gold powder, brass powder, bronze powder, and aluminum dioxide powder, said material having a grain size of 30 to 100 microns.

11. A substrate coated with a mixture according to claim 9, wherein said substrate is selected from the group consisting of metal, wood, ceramics, plastic and foil.

12. Substrate according to claim 11, wherein a surface of the substrate is predyed blue in color.

* * * * *